United States Patent
Ben Ahmed et al.

(10) Patent No.: US 7,372,178 B2
(45) Date of Patent: May 13, 2008

(54) LINEAR ACTUATOR OR GENERATOR WITH RODS

(75) Inventors: Abdel Hamid Ben Ahmed, Rennes (FR); Bernard Multon, Rennes (FR); Pierre-Emmanuel Cavarec, Mordelles (FR); Marc Antunes Menoita, Bruz (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 506 days.

(21) Appl. No.: 10/520,127

(22) PCT Filed: Jul. 1, 2003

(86) PCT No.: PCT/FR03/02034

§ 371 (c)(1),
(2), (4) Date: Jun. 21, 2005

(87) PCT Pub. No.: WO2004/004102

PCT Pub. Date: Jan. 8, 2004

(65) Prior Publication Data

US 2006/0163951 A1    Jul. 27, 2006

(30) Foreign Application Priority Data

Jul. 1, 2002  (FR) .................................. 02 08194

(51) Int. Cl.
*H02K 41/03* (2006.01)

(52) U.S. Cl. .......................................... 310/12; 310/14
(58) Field of Classification Search ............. 310/12–14
See application file for complete search history.

(56) References Cited

U.S. PATENT DOCUMENTS

| 3,103,603 | A | * | 9/1963 | Reutter ........................ 310/30 |
| 3,697,979 | A | | 10/1972 | Kealy |
| 3,869,625 | A | * | 3/1975 | Sawyer ........................ 310/12 |
| 4,286,180 | A | * | 8/1981 | Langley ....................... 310/12 |
| 4,532,431 | A | * | 7/1985 | Iliev et al. .................. 290/4 R |
| 4,864,169 | A | * | 9/1989 | Rioux et al. ................. 310/12 |
| 5,081,381 | A | * | 1/1992 | Narasaki ...................... 310/12 |
| 5,149,996 | A | * | 9/1992 | Preston et al. ............... 310/12 |
| 5,521,446 | A | * | 5/1996 | Chalupa ...................... 310/12 |
| 2006/0163951 | A1 | * | 7/2006 | Ben Ahmed et al. ......... 310/12 |

FOREIGN PATENT DOCUMENTS

| EP | 0218522 | * | 9/1986 |
| EP | 1134444 | * | 9/2001 |
| JP | 61-150661 | * | 7/1986 |

* cited by examiner

*Primary Examiner*—Karl Tamai
(74) *Attorney, Agent, or Firm*—Foley & Lardner LLP

(57) ABSTRACT

The invention concerns an electrical machine, whereof the active part includes a global solenoid winding (110, 210, 310) for each phase and includes, inside said winding(s), a stack of ferromagnetic or non-magnetic parts (400) and magnetized parts (500), the ferromagnetic or non-magnetic parts being provided with passages traversed each by at least one relatively sliding element (600), each sliding element constituting a succession of portions alternately magnetic (620) and non-magnetic (630), the passages formed in the ferromagnetic or non-magnetic parts of the stack forming orifices whereof the internal cross-section encloses each time one sliding element, the sliding elements (600) consisting in rods having each an outer periphery matching the internal cross-section of the traversed orifices.

13 Claims, 4 Drawing Sheets

LINEAR ACTUATOR OR GENERATOR WITH RODS

The invention relates to electrical actuators or generators, particularly when they are designed to supply or accept a very high force density, in other words a large force in a small volume.

In general, a mechanical drive often requires that a large thrust force should be obtained without heavy or large systems.

This is the case for transport equipment (aircraft, trains).

For example, the platform with variable inclination (of a swing-type train is actuated by jacks that must satisfy these requirements. Similarly, active compensation for vibrations in any type of transport equipment requires the use of small but powerful jacks, with high dynamic performances.

Hydraulic or pneumatic jacks, or rotating electrical actuators requiring a rotation/translation type movement transformation (typically using a screw-nut assembly) are used in normal actuator applications with high force density.

A force density of 300 N of generated force/liter of volume occupied is typically obtained with electrical direct linear actuators (without any rotation—translation movement conversion), and this force density is often too low.

Furthermore, the various indirect electrical actuators or jacks available in the past have serious disadvantages including limitations of the mechanical pass band and controllability, severe mechanical wear and noise constraints, the need for a pressurized fluid supply with the complexity inherent to such a supply, and more generally a low global energy efficiency.

In the field of electrical actuators, it has been proposed to increase the surface areas of air gaps, namely magnetic interfaces between fixed and mobile parts.

However, in this type of actuator, typically called multi-air gaps with global winding, it is found that the mechanical strength of mobile parts is particularly low, due to their small cross-section and guidance difficulties that are particularly difficult to overcome.

The purpose of this invention is to solve the disadvantages of known techniques, in other words to propose an electrical actuator with several mobile elements, with a particularly high force density and with a high mechanical reliability while facilitating mechanical guidance.

This purpose is achieved according to the invention by using an electrical machine forming an actuator or generator comprising an active part with one or several phases designed to be connected to an electrical source or load, and a passive part, these two parts being free to move with respect to each other, the active part including a global solenoid winding for each phase and comprising a stack of ferromagnetic or non-magnetic parts and magnetized parts inside this or these windings, the magnetized parts having magnetization directions parallel to the relative displacement direction and successive magnetization directions opposite to each other, the ferromagnetic or non-magnetic parts of this stack being provided with passages each carrying at least one element free to slide with respect to the active part, this or these sliding elements forming the passive part, each sliding element including a succession of alternately magnetic and non-magnetic portions arranged to be facing the different magnetized or non-magnetized part of the stack one after the other, such that an alternating magnetic flux is generated in the winding in each phase, characterized in that the passages formed in the ferromagnetic or non-magnetic parts of the stack form orifices for which the internal section surrounds a sliding element each time, and in that the sliding elements are rods each of which has an external periphery complementary to the internal section of the orifices through which they pass, such that each rod interacts magnetically with the ferromagnetic or non-magnetic part through which its external periphery passes.

Other characteristics, purposes and advantages of the invention will become clear after reading the following detailed description given with reference to the attached figures on which:

Figure 6:
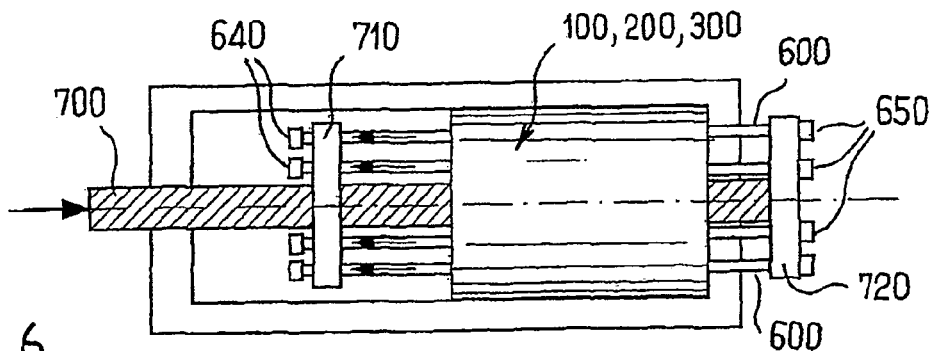
Figure 7:
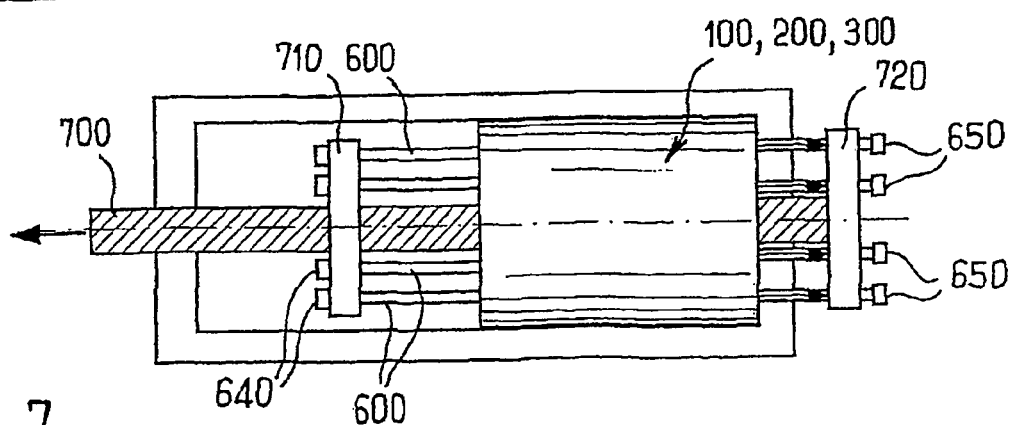
Figure 8:
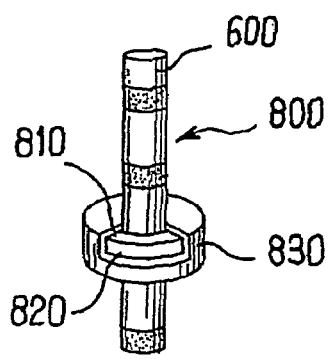
Figure 9:
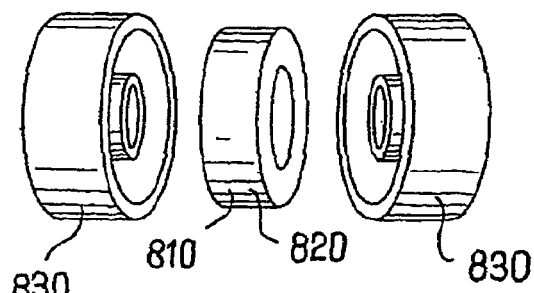
Figure 10:
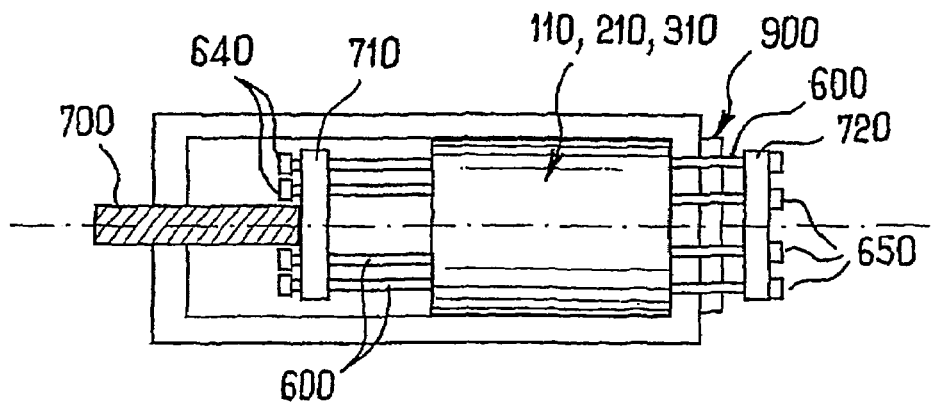
Figure 11:
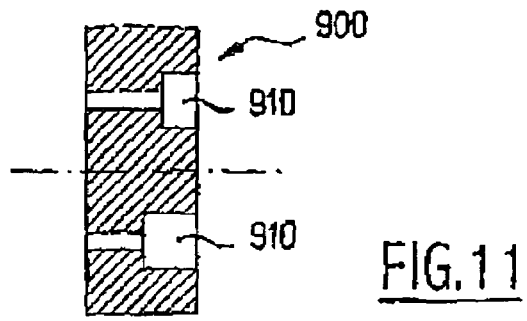
Figure 12:
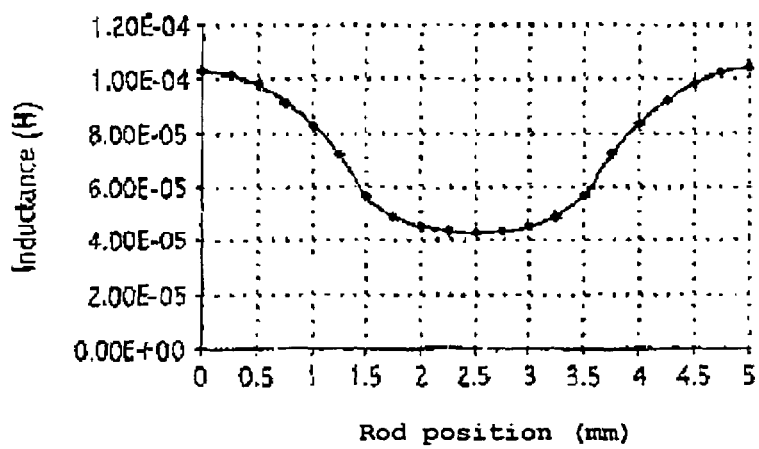
Figure 13:
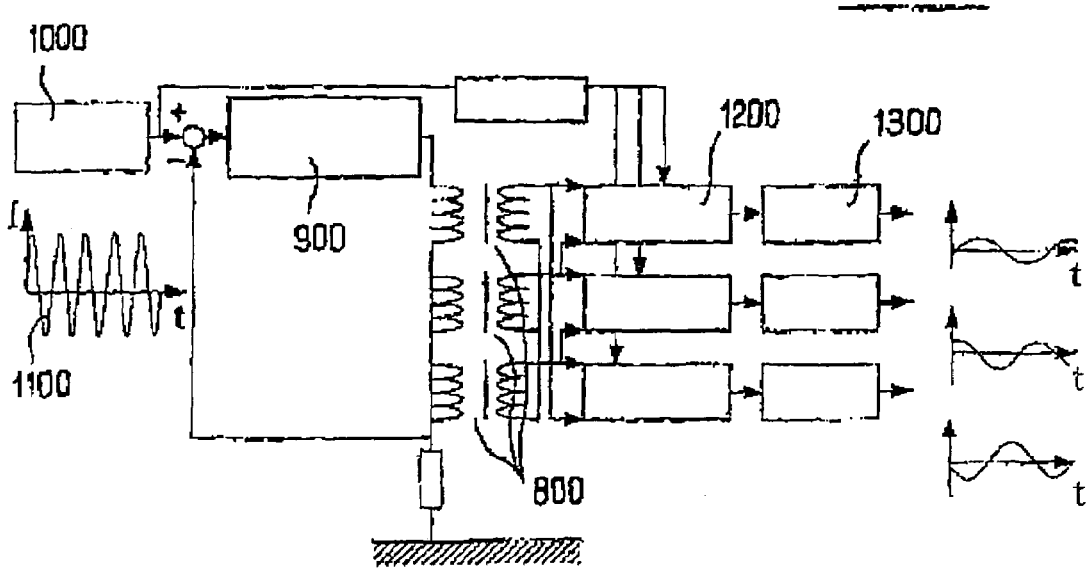

FIGS. 6 and 7 diagrammatically represent an electrical machine according to the invention, in two positions in which the forces produced are in opposite direction to each other;

FIG. 8 is a sectional perspective view of a position sensor according to a preferred embodiment of the invention;

FIG. 9 is an exploded view of this sensor;

FIG. 10 is an overview of an electrical machine according to the invention illustrating the position of a support for the sensor in FIGS. 8 and 9;

FIG. 11 is a view of a sensor support according to an embodiment of the invention;

FIG. 12 is a plot illustrating the variation of the magnetic inductance of the primary winding of such a sensor as a function of the position of a corresponding mobile element;

FIG. 13 is an electrical diagram of a differential measurement device processing and analyzing output signals from three such sensors.

This device is naturally reversible provided that the load and the source are also reversible.

Motor type operation occurs when there is an electromechanical conversion between a source and a load, the source being electrical in nature (in which case we refer to an electrical power supply) and the load being mechanical in nature (in which case we refer to the driven load). Generation type operation occurs when the source is mechanical in nature (driving mechanical source) and the load is electrical in nature and absorbs electrical power.

Secondly, the device comprises two parts, firstly a part comprising electrical windings and permanent magnets and a completely passive part composed of rods, each part being fixed or mobile. Therefore we will talk about a relative sliding movement to qualify all possibilities of relative movement between the two parts.

For easier understanding, we will consider the case in which the electrical machine is operating as a motor (or actuator) and the mobile part corresponds to the rods. The comments and characteristics that will be described will thus be equally valid for operation as a generator and/or with a fixed passive part.

The electrical machine described herein is composed of an active part powered by one or several power windings (windings 110, 210 and 310 in FIG. 3), called armature windings. These windings are in solenoid form and completely surround one zone of the powered part and the passive part.

Apart from these windings, the powered part comprises a stack of magnetic or non-magnetic plates and permanent magnets 500.

The passive part is composed of one or several elongated elements 600, the shape of which will be described later.

Unlike conventional structures (particularly with rotating fields), the known "multi-air gaps with global winding" technology can be used to reduce the displacement pitch without correspondingly degrading the total converted energy. Therefore, this can increase the generated force, for a given total volume and for given thermal and magnetic conditions.

The objective in this case is to maximize the sum of the air gap surfaces, in other words the active external surface areas of the rods, with respect to the volume of the actuator considered.

To achieve this, this example embodiment includes a series of rods each of which has a circular periphery that interacts with each plate or ferromagnetic or non-magnetic part around its entire periphery.

In other words, the magnetic fluxes transported by the sheet metal parts are applied to the rod around its entire periphery.

The main advantage of this shape lies in the manufacturing precision and thus the possibility of facilitating mechanical guidance while enabling small air gaps.

An ovoid section rod, or more generally a rod totally surrounded by ferromagnetic or non-magnetic zones themselves in contact with the magnets, would also advantageously generate maximum variation of magnetic flux with respect to the extent of the cross-section through this rod.

In order to make the magnets 500 and the magnetic or non-magnetic parts 400 that entirely surround the cylindrical rod 600 considered, the part powered in this case is partly a composite assembly composed of a stack of magnetic or non-magnetic plates and permanent magnets, and the permanent magnets surround each rod with a shape complementary to the periphery of the rod.

This stack is parallel to the displacement of the rod and alternates along this direction.

The distance defined by the sum of the thicknesses of a magnetic or non-magnetic plate 400 and the next magnet 500, corresponds to a half-relative displacement pitch of a rod.

Figure 3:
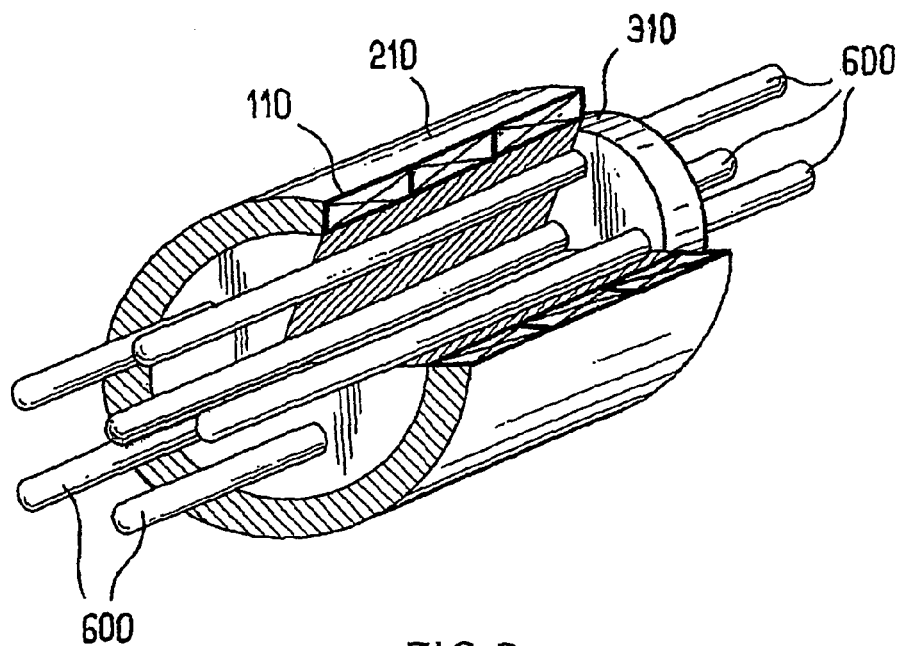
FIG. 3 is a perspective general sectional view of an electrical machine according to the invention.

More precisely, as shown in FIG. 3, the powered part is composed of three identical phases (q=3) offset in space (in the displacement direction) by a number equal to N*pitch/ (2*q), where N is an integer.

Each phase is composed of:
a power winding 110, 210, 310 (called the armature) in the shape of a solenoid winding surrounding the active zone of the powered part;
a stack of magnetic or non-magnetic circuits (plates) 400 and permanent magnets 500 with magnetization parallel to the displacement. This part comprises circular holes through which the mobile parts 600 pass;
magnetic flux return circuits: two end circuits 120, 130 and an tubular shaped outer circuit 140, all surrounding the windings and the active zone.

The passive part is composed mainly of several parallel rods 600 moving relative to each other through the powered part.

The rods 600 in this case are also composite and comprise a non-magnetic core on which a stack of magnetic and non-magnetic washers are arranged successively as will be described later. But other manufacturing processes could also be envisaged provided that an appropriate longitudinal magnetic—non-magnetic alternation is obtained.

The operating principle of the electrical machine is similar to the principle of synchronous machines with permanent magnets.

In a manner known in itself, and particularly using the known principle of synchronous electrical machines, displacement of the mobile parts 600 generates an alternating flux and consequently an alternating electromotive force (emf) within the power winding.

Based on the same logic, injection of an alternating current synchronous with this emf into the winding (the armature) generates an electromagnetic power with a non-zero average value and therefore an action driving force on the mobile elements and a reaction force on the fixed part.

Figures 1, 2:
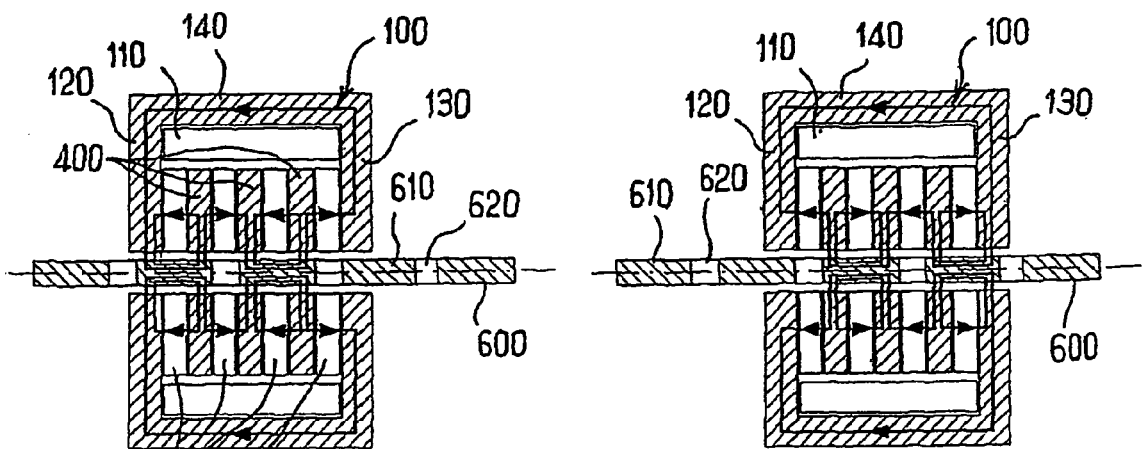
FIGS. 1 and 2 are partial longitudinal sections through the device illustrating two successive positions of the device, referred to as positive conjunction and negative conjunction respectively.
Figure 2A:
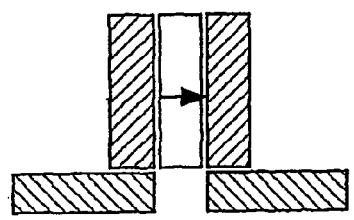
FIG. 2a is a detailed description of an elementary pattern of a powered part of the electrical machine in FIGS. 1 and 2.

There are therefore two characteristic positions of the mobile part, shown in FIGS. 1 and 2; a positive conjunction position (FIG. 1) in which the flux seen by the armature winding and generated by the "active magnets" 500 is arbitrarily positive, and a negative conjunction position (FIG. 2) in which this flux is negative.

The magnets 500 are initially positioned such that their orientation direction is alternating.

Consequently, one magnet 500 out of two is inactive.

The flux from inactive magnets does not pass through the corresponding powered winding but is short circuited by the magnetic part of the rod that is facing it.

The rod 600 is composed of alternately magnetic and non-magnetic elements with a rod pitch equal to twice the pitch of the magnets.

Figure 5:
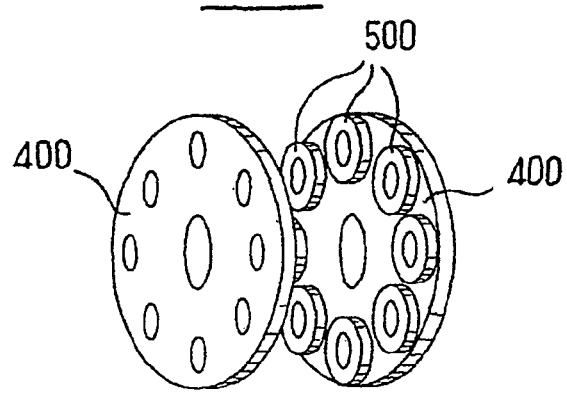
FIG. 5 is an exploded view of a portion of the active part of the electrical machine according to the invention.

Each magnet 500 shown in FIG. 5 is a ring with an internal cross-section conforming with the periphery of a rod that passes through it, but this is only one of several possible embodiments.

Each basic element of the stack making up the powered part therefore comprises:
a magnetic or non-magnetic sheet metal wall 400 with a series of orifices distributed around the edge of its periphery;
and a set of ring magnets 500, each covering the edge of the corresponding orifice.

Therefore all ring magnets thus distributed also form the magnetized spacer that separates two magnetic or non-magnetic sheet metal plates 400.

According to one variant, instead of inserting ring shaped magnets between two magnetic or non-magnetic plates, a single magnet is inserted with the same shape as the sheet metal plates, in other words a magnet in the form of a plate through which several crossing orifices are drilled for each corresponding rod 600.

Figure 4:
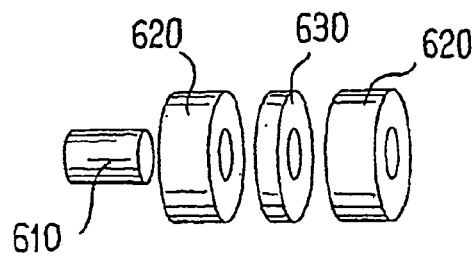
FIG. 4 is an exploded view of a portion of a mobile element of an electrical machine according to the invention.

As shown in FIG. 4, the rods 600 themselves have a particularly advantageous composite structure. Each rod consists of a successive string of rings on a central non-magnetic core.

Thus a non-magnetic rod 610 receives a magnetic ring 620 and a non-magnetic ring 630 with the same diameter alternately, eventually forming a compact rod with an appropriate magnetic structure perfectly complementary to the orifices in the plate 400. Therefore, according to this advantageous arrangement, each of these rods consists of a stack of ferromagnetic parts 610 and non-magnetic parts 620.

In another variant, they may also form a single piece with alternately magnetic and non-magnetic zones.

It should be noted that apart from providing a very high force density, this embodiment also provides excellent mechanical dynamics, in other words a good capacity for acceleration and a wide pass-band, and finally a long machine stroke.

The low inertia of the mobile parts is particularly conducive towards this mechanical dynamics, the low inertia being particularly due to the fact that in this case the mobile part is completely passive, since the fixed part comprises both the power winding and the field coil (in this case the permanent magnets).

The operating mode according to the principle of a synchronous actuator with permanent magnets, variable local reluctance with longitudinal field and global winding is preferred with the invention.

In particular, this particular arrangement results in completely passive and consequently low volume and lightweight rods.

The air gap surface areas necessary to obtain very high force densities are increased, due the cylindrical surface area of the rods.

It should be noted also that the cylindrical structure of the rods also enables precision machining, and precise assembly and guidance.

The cylindrical structure also enables particularly advantageous guidance by sliding strips.

It should be noted also that the fact that the armature completely surrounds the passive part (in other words that the winding can be qualified as "global") also makes the device compact.

This device also comprises a force transmission system made such that all rods 600 are only stressed in tension, regardless of the direction of the generated force that contributes to the production of a device separated into a very large number of small section rods;

FIGS. 6 and 7 show a preferred variant of such a force transmission system.

Firstly, the Figures show a spindle 700 for transmission of the resultant force generated by the actuator. This spindle 700 extends not only outside the machine, but also passes through the complete machine.

In this embodiment, the spindle 700 is fixed to two bearing plates 710 and 720 transverse to this rod, positioned on each side of the fixed active part.

The rods 600 transmit the force onto these plates 710, 720 in order to actuate the main spindle 700.

To achieve this, each rod 600 passes through the two plates 710 and 720 to form a head 640, 650 beyond each plate and opposite the active part, preventing it from being extracted from the corresponding plate.

When the force transmitted on the spindle 700 is a thrust, in other words it is in the direction of the actuated load, the rod heads 640 adjacent to the load tend to separate from the plate 710 (this tendency is symbolized by a separation in the Figures), while the heads 650 furthest from the load apply a force in contact with the corresponding plate 720, and push it towards the load.

On the other hand, when the force on the spindle 700 is a tension force, the rod heads 650 furthest from the load tend to separate from their corresponding plate 720 (symbolic separation in the Figures) and the rods are tensioned on the load side through the heads 640 in contact, on the plate 710 nearest to the load.

Once again, the entire force is transmitted to the spindle 700 only by applying tension to the rods 600. The force is transmitted on the end heads of the only plate located on the tensioned side of the rod.

In this example embodiment, there is no play under the rod heads from the plate considered, such that relief of the thrust force at one end of the rods does not necessarily cause separation of the rod heads considered.

However according to one variant, the lengths of the rods 600 may be chosen to be slightly greater than the gap between the two plates 710 and 720, such that there is a slight longitudinal clearance between the head 640, 650 of each rod 600 considered, and each corresponding force transmission plate 710, 720.

Therefore the rods are stressed in tension only regardless of the direction of the force, which relieves mechanical stresses in the rod (and prevents buckling). The extent of the cross-sections of mobile elements (rods and others) can then be reduced compared with what is used in a conventional transmission system. Thus, the number of rods that can be arranged in a particular volume may be high. The force density is increased correspondingly.

In other words, forces in tension rods only make it possible to use rods with a particularly small cross-section, enabling a large number of rods and the corresponding advantages.

Furthermore, this machine is provided with a position sensor 800 that is integrated into the structure and does not oversize the machine, such that the overall volume of the assembly is not increased. This sensor, which is very much appreciated for auto-control of the machine, is of the variable reluctance type. This technology has the advantage of homogeneity with the machine technology, thus contributing to the possibility of operation in difficult environments.

It is composed of a primary excitation winding 810 and a secondary measurement winding 820. As shown in the FIGS. 8 and 9, this sensor uses the general shape of the rods 600 described above. The two windings 810 and 820 each form a ring solenoid both inside a cover 830.

The cover itself is in the form of a hollow ring, and the ring assembly 800 thus formed has an inside diameter complementary to the diameter of the rod 600 when the rod is assembled.

The sensor 800 is inserted around the rod in an end area of the actuator, into which the rod slides during operation of the actuator.

The reluctance (and therefore the inductance) of the sensor 800 depends on the position of the mobile rods 600. Injection of a current into the primary 810 of the sensor, with an appropriate frequency and amplitude, generates an electromotive force at the secondary 820, the modulus of which depends particularly on the value of the inductance and consequently the position of the rod 600.

Thus, the rod position information can easily be extracted by applying an appropriate electronic and/or digital processing to the measurement of the measured electromotive force (FIG. 13 shows an example of a differential measurement device).

In its three-phase version, the actuator comprises three position sensors of this type arranged at the end of the actuator on three different rods, and each dedicated to controlling one of the three phases. Each sensor 800 is offset in the direction of displacement of the rods, by a number equal to N*pitch/(2*q), where N is an integer and q is the number of phases.

In FIG. 12, the inductance seen by the windings 810 and 820 of the sensor as a function of the position of the rod 600 that it surrounds, is approximately in the shape of a sine curve, such that taking account of this sinusoidal inductance in three offset positions with the same offset as the different phases, provides a means of deducing the precise position of the actuator at each instant.

A sensor holder 900 like that shown in FIG. 11 is used to position the three sensors in this way, and is composed of a plate made of a non-magnetic material with three through passages in which each of the three passages also forms a sensor housing cavity 910, a cavity 910 with a variable depth, the cavity depth corresponding to the position chosen for the sensor. The difference in cavity depths is equal to one third of the pitch between the rods.

In the diagram in FIG. 13, the device for differential processing of signals output by the sensors 800 is based on the principle of the same alternating current power supply (excitation frequency) for each of the three sensors (the primary windings of the three sensors are thus put into series), power supply obtained by current regulation of a power supply consisting of a corrector 900, starting from the signal output by a sine generator 1000 and by an alternating power supply 1100. The sine generator signal is used to demodulate (synchronous demodulator 1200) the output signal recorded on a sensor 800 and subjected to a corresponding low pass filter 1300 so as to provide the position signal at the output from each low pass filter 1300, the variation of the signal being perfectly synchronous with the electromotive force of the phase considered (machine power winding). Taking account of each of these three sinusoidal signals provides a means of measuring the relative position of all rods (passive part) with respect to each of the three phases (three-phase version) in real time.

The sensor as described herein avoids conventional position sensors, for example of the opto-magnetic type, that usually limit the usage environment, generate pollution, and increase the cost of the assembly.

The fact that the position sensor uses mobile parts of the actuator is also an advantage in itself.

In its three-phase version, the actuator is powered by a conventional three-phase power inverter with six power switches and its three phases are preferably coupled in star formation. Seen from the power inverter, its operation is similar to the operation of a conventional synchronous machine with permanent magnets, with the sole difference that magnetic couplings between phases are very low or even negligible.

The many advantages provided by the various arrangements described will have been made clear from the presentation of the particular embodiment described above.

The tests carried out on this actuator have demonstrated that a total force of 1270 N can be supplied for an rms current of 15 A.

Therefore, the corresponding force density is 1.2 kN/liter, and it would even be possible to achieve a density of 2 kN/liter in pulse mode using the configuration described herein. Significant progress can still be made because the structure has not yet been optimized.

Apart from the applications mentioned in the preamble to this description, it is also worth mentioning other possible uses, such as a mechanical drive application for manipulating industrial robots, for example for use in the automobile industry, in addition to aircraft control surface applications.

Other example applications for which this invention is very useful include applications requiring a large mechanical pass-band such as active compensation of vibrations in traction (urban vehicles, high speed trains).

The invention claimed is:

1. An electrical machine forming an actuator or generator, comprising an active part that includes one or several phases designed to be connected to an electrical source or load, and a passive part, the active part and passive part being free to move with respect to each other, the active part including a global solenoid winding for each phase and including a stack of ferromagnetic or non-magnetic parts and magnetized parts inside the windings, the magnetized parts having magnetization directions parallel to a relative displacement direction and successive magnetization directions opposite to each other, the ferromagnetic or non-magnetic parts of the stack including passages that each carry at least one element free to slide with respect to the active part, the sliding elements forming the passive part, each sliding element including a succession of alternating magnetic portions and non-magnetic portions arranged to be facing different magnetized or non-magnetized parts of the stack one after the other, such that an alternating magnetic flux is generated in the winding in each phase, characterized in that the passages formed in the ferromagnetic or non-magnetic parts of the stack form orifices with an internal section that surrounds a sliding element, wherein the sliding elements are rods each of which has an external periphery complementary to the internal section of the orifices through which they pass, wherein each rod interacts magnetically with the ferromagnetic or non-magnetic part through which its external periphery passes.

2. An electrical machine according to claim 1, wherein the orifices have a circular cross-section and each rod is in the form of a rotating cylinder.

3. An electrical machine according to claim 2, wherein each of the rods includes a longitudinal groove.

4. An electrical machine according to claim 1, wherein the machine is adapted so that the number of phases is equal to q and each phase is offset from a mobile part in the displacement direction by a distance such that each of the magnetic fluxes is offset by a number equal to $N\pi/q$, where N is an integer.

5. An electrical machine according to claim 1, wherein each magnetized part is formed by a ring surrounding a corresponding rod.

6. An electrical machine according to claim 1, wherein each magnetized part is formed by a magnetized plate perpendicular to the displacement, provided with a series of orifices, so that a corresponding rod may pass through each orifice.

7. An electrical machine according to claim 1, wherein each rod includes a central non-magnetic core and a series of alternately magnetic and non-magnetic rings.

8. An electrical machine according to claim 1, wherein the machine includes one or more annular positioning sensors that include one or several windings, wherein the sensors are fixed to the active part so that one or several rods of the passive part may pass through them.

9. An electrical machine according to claim 8, wherein each of the positioning sensors is located around a rod and offset in the direction of displacement of the active and passive parts with respect to each other.

10. An electrical machine according to claim 1, wherein the machine includes at least one device for collection of forces applied by at least one rod, wherein the rod and the device are adapted to cooperate by applying a single-directional contact along a tension direction of the rod, wherein the force collection device does not create any compression reaction on the rod.

11. An electrical machine according to claim 10, wherein there is a clearance between the contacts of the rods and the force collection devices.

12. An electrical machine according to claim 10, wherein the force collection device is a transverse plate fixed to a main spindle of the machine, wherein each rod passes through the plate and is provided with a bearing head in contact with the plate.

13. An electrical machine according claim 1, wherein the rods have a cross-section, wherein the circumference of a rod forms a smooth line with no abrupt change of direction.

* * * * *